(12) United States Patent
Keppel et al.

(10) Patent No.: US 10,771,404 B2
(45) Date of Patent: Sep. 8, 2020

(54) PERFORMANCE MONITORING (71) Applicant: Intel Corporation, Santa Clara, CA (US)

(72) Inventors: David Keppel, Mountain View, CA (US); Thomas D. Lovett, Portland, OR (US); Michael A. Parker, Santa Clara, CA (US); Robert C. Zak, Jr., Bolton, MA (US)

(73) Assignee: Intel Corporation, Santa Clara, CA (US)

( * ) Notice: Subject to any disclaimer, the term of this patent is extended or adjusted under 35 U.S.C. 154(b) by 745 days.

(21) Appl. No.: 15/388,604

(22) Filed: Dec. 22, 2016

(65) Prior Publication Data
US 2018/0183732 A1 Jun. 28, 2018

(51) Int. Cl.
*H04L 12/879* (2013.01)
*H04L 12/26* (2006.01)

(52) U.S. Cl.
CPC .......... *H04L 49/901* (2013.01); *H04L 43/022* (2013.01); *H04L 43/08* (2013.01); *H04L 43/10* (2013.01); *H04L 43/16* (2013.01)

(58) Field of Classification Search
CPC ..... H04L 49/901; H04L 43/08; H04L 43/022; H04L 43/16; H04L 43/10; H04L 41/50; H04L 51/18
USPC ...................................................... 709/224
See application file for complete search history.

(56) References Cited

U.S. PATENT DOCUMENTS

| | | | |
|---|---|---|---|
| 5,901,291 A * | 5/1999 | Feeney | G06F 13/128 370/409 |
| 8,204,930 B1 * | 6/2012 | Kee | H04L 67/2842 709/203 |
| 8,438,269 B1 | 5/2013 | West | |
| 2003/0225876 A1 | 12/2003 | Oliver et al. | |
| 2004/0006724 A1 * | 1/2004 | Lakshmanamurthy | G06F 11/348 714/25 |
| 2008/0021994 A1 * | 1/2008 | Grelewicz | G06F 11/3428 709/224 |
| 2012/0066370 A1 | 3/2012 | Ramraj et al. | |
| 2012/0192016 A1 | 7/2012 | Gotesdyner et al. | |
| 2012/0226837 A1 * | 9/2012 | Cruickshank | G06F 11/349 710/110 |
| 2012/0226838 A1 * | 9/2012 | Visalli | G06F 11/364 710/110 |
| 2016/0014010 A1 * | 1/2016 | Della Corte | H04L 43/04 709/224 |
| 2017/0230297 A1 * | 8/2017 | Park | H04L 41/0681 |
| 2017/0359735 A1 * | 12/2017 | Jain | H04W 24/02 |

OTHER PUBLICATIONS

International Search Report and Written Opinion issued in PCT/US2017/61422 dated Mar. 15, 2018; 12 pages.

\* cited by examiner

Primary Examiner — Ruolei Zong
(74) Attorney, Agent, or Firm — Patent Capital Group (57) ABSTRACT

Particular embodiments described herein provide for a network element that can be configured to receive a request message, wherein the request message includes a read trigger, an indicator selector, and a completion trigger, determine an indicator that relates to the indicator selector, and perform an action when the read trigger is activated.

25 Claims, 6 Drawing Sheets

PERFORMANCE MONITORING

This invention was made with Government support under contract number H98230B-13-D-0124-0132 awarded by the Department of Defense. The Government has certain rights in this invention.

TECHNICAL FIELD

This disclosure relates in general to the field of computing, and more particularly, to performance monitoring.

BACKGROUND

High-performance computers are built of many processors/cores connected by a network, often called a "fabric." Application performance depends on good use of the fabric, so it is common for fabrics to provide measurement mechanisms to help with application tuning. Fabrics typically have many performance counters for this use. In addition, performance counters are often used in computing systems to provide insight into the behavior of the system. For example, some systems can monitor and analyze data collected by performance counters in order to tune the performance of the system.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

The FIGURES of the drawings are not necessarily drawn to scale, as their dimensions can be varied considerably without departing from the scope of the present disclosure.

DETAILED DESCRIPTION OF EXAMPLE EMBODIMENTS

Example Embodiments

Figure 1:
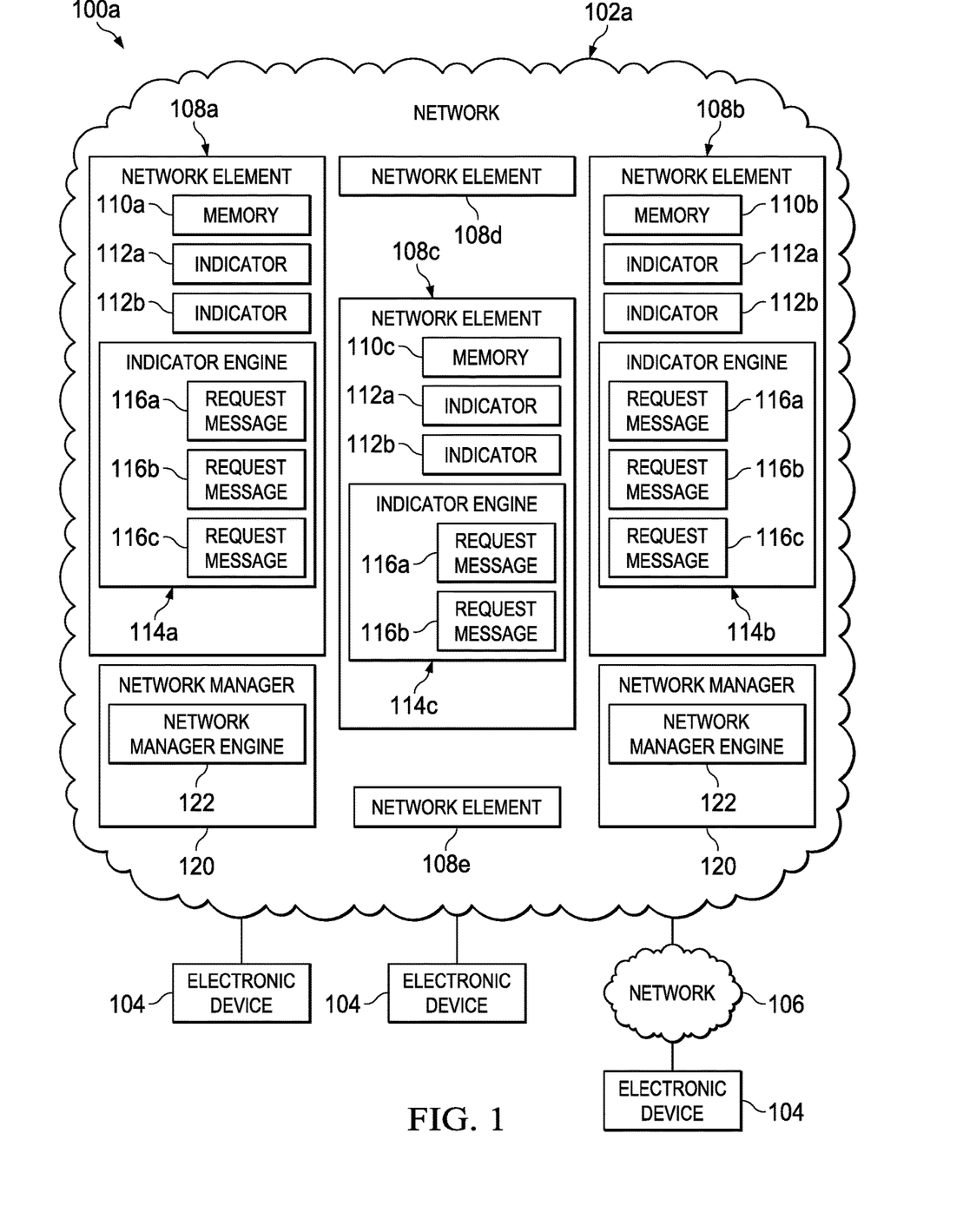
FIG. 1 is a simplified block diagram of a communication system for process management, in accordance with an embodiment of the present disclosure.
Figure 2:
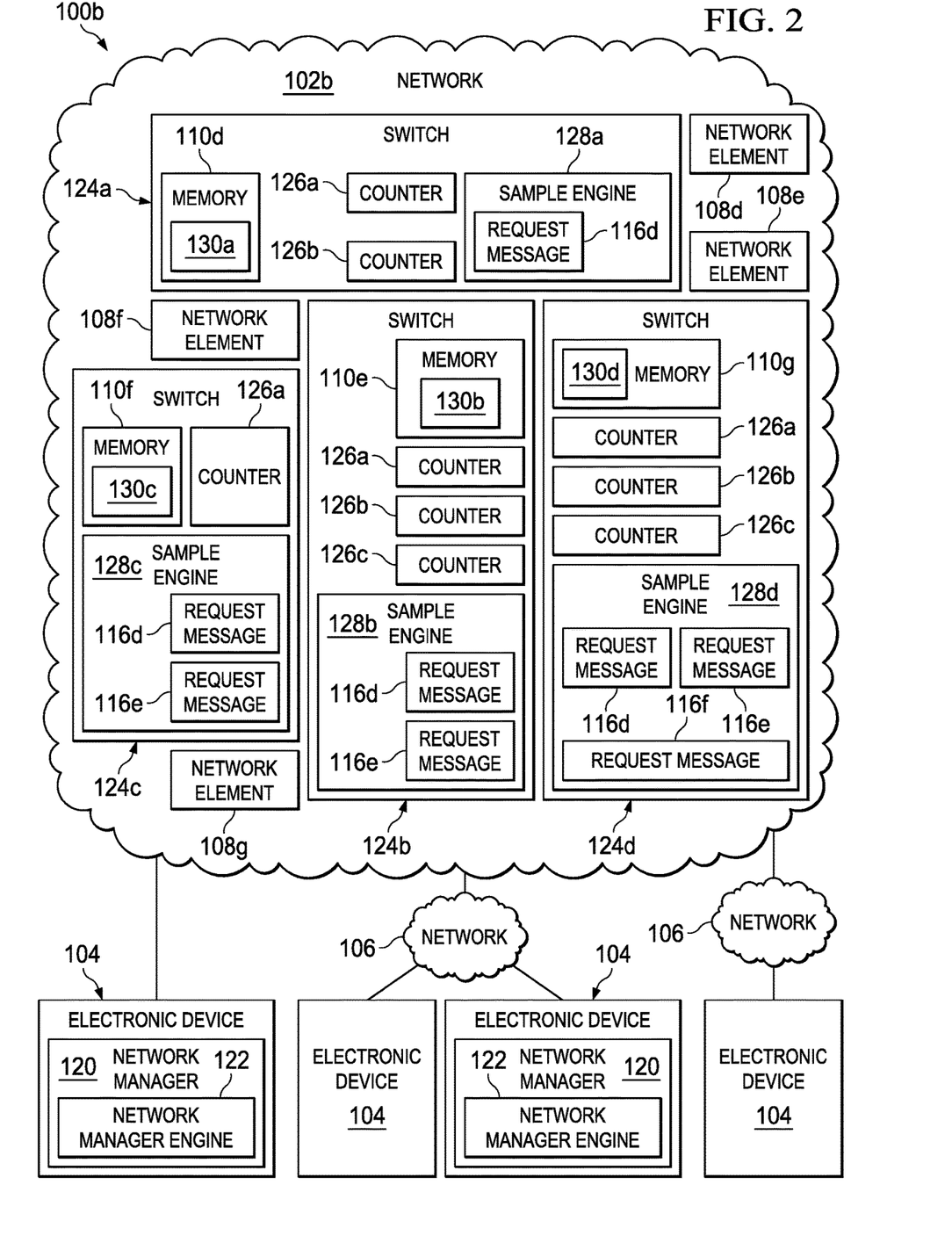
FIG. 2 is a simplified block diagram of a communication system for process management, in accordance with an embodiment of the present disclosure.

FIG. 1 is a simplified block diagram of a communication system 100*a* to implement improved performance monitoring of a network, in accordance with an embodiment of the present disclosure. FIG. 2 is a simplified block diagram of a communication system 100*b* to implement improved performance monitoring of a network, in accordance with an embodiment of the present disclosure. For purposes of illustrating certain example techniques of communication systems 100*a* and 100*b*, it is important to understand the communications that may be traversing the network environment. The following foundational information may be viewed as a basis from which the present disclosure may be properly explained.

High-performance computers are built of many processors/cores connected by a network, often called a "fabric". Application performance of the network often depends on good use of the fabric, so it is common for fabrics to provide measurement mechanisms in order to help with application tuning. Fabrics typically have many performance counters for this use. Fabrics are typically built from a mixture of core interfaces, host fabric interfaces (HFIs), network interface controllers (NICs), and switches. The switches connect together HFIs and also connect switches to other switches, to construct a larger network.

A core interface may read values from an HFI directly by performing load instructions that read the HFI performance counters. However, the switches are at varying distances from the core interface and so cannot be accessed directly. Instead, it is common to read switch counters by sending a designated read counters message to a switch and in response, the switch creates a message with a sample of the switch performance counters. A down-side of this approach is that every attempt to read the switch counters requires two messages to be sent on the network. Each message has some overhead, which interferes with other data transfers on the network and measuring the switches can actually interfere with the measurement of other switches as measurement traffic builds on the network. A second down-side is that message transmission times are variable and unpredictable. That means measurements are imprecise and repeated measurements or attempts at simultaneous measurement on several switches are even less precise, which reduces the quality of data collected. Further, an attempt to capture/measure a specific situation may require many messages to ensure a desired particular measurement is received. Sending more messages increases the distortion/errors introduced by the attempted measurement and can further reduces data quality. The reduced quality can result in the requirement for more measurements to capture and/or measure the specific situation and more measurements results in more messages which further increases the distortion/errors introduced by the attempted measurement.

Currently, solutions only send one reply message each time the counters are sampled. Also, one common reason for reading counters is to perform statistical analysis on several sampled values. Since message delivery times are uncertain, most current systems have difficulty controlling the time of sampling. Jitter/variation in the sample time can reduce the statistical quality of the data and thus hurts the ability to use the counter data.

A communication system for process management, as outlined in FIGS. 1 and 2, can resolve these issues (and others). Communication systems 100*a* and 100*b* may be configured for performance monitoring of a network with relatively small overhead.

In an example, communication systems 100*a* and 100*b* can be configured to communicate requests messages (e.g., request message 116 shown in FIG. 3) with read triggers (read trigger 134 shown in FIG. 3) that indicate conditions when counters should be read, with counter selectors (e.g., indicator selector 132 shown in FIG. 3) that indicate which counters to read, and with completion triggers (e.g., completion trigger 136 shown in FIG. 3) to indicate how to proceed after counter data has been collected. Counter data can be communicated to a local buffer (e.g., buffer 130), rather than a reply being sent immediately. When selectors collect only a subset of counters, read triggers can instruct a switch to read those counters several times (e.g., at periodic intervals) and add them to a local buffer. Then, after several repetitions, a single reply message can be sent that contains repeated samples of counters. This both reduces overhead and can further improve quality of data collected.

Figure 3:
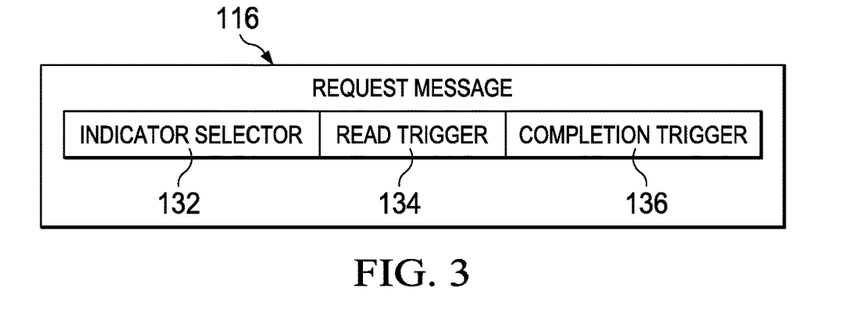
FIG. 3 is a simplified block diagram of a portion of a communication system for process management, in accordance with an embodiment of the present disclosure.

In an example, a network element (e.g., host 108a) or switch (e.g., switch 124a) can receive a request message that has fields indicating how to read indicators (e.g., indicator 112a) or counters (e.g., counter 126a). Schematically, the request message can include three sets of fields, indicator selector 132, read trigger 134, and completion trigger 136 (as illustrated in FIG. 3). The data in the counters can help determine a status of the network device and/or network 102b.

The indicator selector (e.g., indicator selector 132) can indicate a set or subset of indicators, registers, counters, etc., to read. For example, a given performance study might sample only the total bytes of data that ingress and egress on each port of a switch. Collecting fewer counters and/or re-ordering the counter reads allows counters to be collected closer in time and can improve the statistical merit of the data. For example, if counters {A, B, C, and D} are collected, there can be a time gap between reading A and reading D. In turn, A can change before D is read and the sampled value of A corresponds to a different point in time than the sampled value of D. The gap thus hurts any conclusion based on their combined values. Collecting just {A, D} reduces the gap.

Also, collecting a subset of counters allows the subset to be sampled more frequently. For example, if counters are internally sampled at 200 nanosecond (nsec) intervals, than sampling 500 counters means a minimum of 100 microseconds (usec) before any one counter can be re-sampled. Sampling 50 counters at the same 200 nsec rate reduces the re-sample interval to 10 usec.

In addition, having a read trigger that allows for collecting only a subset of counters allows multiple samples to be stored (e.g., in buffer 130a) to allow a single reply message that can include several samples rather than sending several reply messages for several samples. This can reduce the overhead (disturbance) of read triggers because a read trigger for each of several samples does not need to be sent. Also, the read trigger can indicate a condition that controls repeated sampling into a local storage such as a buffer. For example, a read trigger could be: "Starting at TIME, sample the counters every INTERVAL. TIME can indicate a specific time. INTERVAL can indicate an interval of time, iterations, conditions, etc.

The read triggers (e.g., read trigger 134) can indicate when to sample the indicators or counters. In an example, the read trigger may be a timestamp. In other examples, the read trigger may be a congestion metric. More specifically, in each time window INTERVAL, if metric CONGESTION exceeds THRESHOLD, sample the counters. CONGESTION can indicate a level of congestion on the network, in an area of the network, at a network element, etc. THRESHOLD can indicate a threshold such as when a predetermined value is determined, a percentage threshold is met, etc. Congestion metrics may be structural (e.g., certain switch queues filled up) and/or temporal (total traffic observed in some interval exceeds a threshold). Thus, a network element (e.g., host 108a or switch 124a) can be configured in advance and data is collected only in response to "interesting" events or events that are of interest to an administrator. The read trigger may be a compound expression such as "a OR b" or "c AND d," "a NOR b," a NAND b," a, b, OR c," a, b, AND c," a, b, NOR c," "a, b, NAND c," or some other compound expression. For example, read the counters if (some congestion metric is observed) OR (more than some interval has passed since the last sample). Read triggers may also indicate that when the local storage is full, the data collection should stop. This collects data which most accurately reflects conditions when sampling began. Alternatively, it may indicate that data collection should wrap and over-write earlier data, so that when the collected data is sent, the send data is always the most-recent data.

Completion triggers (e.g., completion trigger 136) can indicates how to proceed after data has been collected. A straight-forward approach is to fill a local buffer and then send a message with the collected data. One alternative is to respond even if the local buffer has not filled (e.g., after some interval timeout). Thus, if a particular switch has low congestion, it will still send a timely reply message showing that congestion has not occurred or has been limited. Another alternative is to delay the reply message until some exit condition such as an "exit time" has been reached, or to delay the reply message until another message arrives requesting a copy of the collected data. A delayed reply may help reduce the effects of reply messages during collection. For example, if 1,000 switches are instructed to collect data in the same general interval, then without completion triggers, they may create a burst of traffic which is recorded by some other switches which are still sampling. Using a completion trigger can help ensure all measurement traffic is outside of the measurement interval and thus avoid distorting the measurement. Once a reply is generated, the system can determine if data collection should stop or continue. Options to repeat can include to repeat a fixed number of times (including repeat=0), repeat until some exit condition is reached (e.g., repeat as long as congestion is above some threshold, but then stop), repeat until a message is received that indicates collection should stop, etc.

Completion triggers can also indicate where to send a reply message after data has been collected. For example, the reply message may be sent to an original sender or to a different location or destination. In an example, a completion trigger may indicate that reply messages are to be sent to a designated recipient or a centralized element that will aggregate messages. For example, a completion trigger may indicate that host 108a-108c are to send the reply message to network manager 120. In another example, a completion trigger may indicate that reply messages are to be sent to a nearby aggregator element rather than a centralized element where the aggregator element can be part of a collection or neighborhood of switches. For example, a completion trigger may indicate that host 108a is to send the reply message to host 108c where messages from other network elements are aggregated and/or summarized before being sent to network manager 120. A network can include several groups or neighborhood of switches that each include an aggregator switch or element that can be configured to summarize replies before communicating the summary or replies to a central element or network manager.

In an implementation, a first command in a request message is read and a read trigger can be used to initialize wait logic, which then waits for an initial condition. After the initial condition is satisfied, the counters are read according to a counter selector. If the read trigger indicates multiple samples should be read and if there is still local space available, then the wait logic is updated accordingly and used to wait for the next condition. When no further counters are to be read, the completion triggers can be performed. There may be multiple commands in a request message, in which case the next command is extracted and performed as described above.

Finer-grained control over reading of counters can be provided by allowing the counter selector to optionally indicate how to read the indicated registers. The simplest approach is to copy the counter value, but other approaches may improve data quality. For example, one way to use a counter value is to compute an average rate over the sample interval. However, bursty behavior during the interval means the average may not be representative of true behavior. In turn, a better approach may be to sample a counter several times in the interval (sub-sample), and collect the number of sub-samples over some threshold and the sum of those over threshold samples. The interval may be a time period, a number of samples, or some other condition that can be used to create the interval.

An example of how to read the counters can include sub-sampling interval where the counter is sampled at 100 milliseconds (msec) intervals and sub-sampled at 10 msec intervals. Another example can include a source metric that defines or identifies what counter is used to use to drive the collection of data, which may be different than the counter being read. For example, if a queue overflows during some interval, count the number of bytes communicated during the interval. The queue overflow counter is the "source metric," while the indicated counter selector indicates the bytes communicated counter. A threshold on each sub-sample may only record (merge) sub-sample values over the threshold. A count may record the number of matching (e.g., over threshold) subsamples in addition to (or instead of) the recorded (merged) metric. A merge can indicate how to record (merge) collected values. For a true counter, this could be to sum the changes that exceed a threshold. Alternatively, it could be some function, such as the maximum change seen in any sub-interval. For a "counter" which is a bitmask of events, it could be a bitwise OR of counter values seen over the sub-samples. A merge may also indicate some end-of-interval processing. For example, compute an average and record the average, rather than recording the sum and the number of sub-samples. Note that a single counter may be recorded several ways, for example, in the indicated interval, collect the minimum, maximum, mean of those values over a given threshold, etc.

A single request message may indicate a sequence of commands, including variable sampling detail and variable sampling precision. For example, variable sampling can include a first command to read many counters followed by a command to periodically read a few counters. This approach can reduce space use and message rate compared to always reading many counters and can improve the detail of the data compared to always reading a few counters. Variable sampling precision can include a command to first record all bits from each of a set of registers and then a second command to repeatedly sample, but record only the low sixteen (16) bits of each register. When the sampling interval and counter advance rates are compatible, this can allow message size reduction, but for each 16-bit sample, the high bits can be reconstructed from the first all bits sample or all-bits. This saves space, but can still provide full resolution.

When only a subset of counters are needed, communication systems 100a and 100b can be configured to allow for a reduced overhead. For example, some commercial switches have about 512 performance counters. In a specific implementation, only sixty-four (64) counters may be useful. Collecting only those counters thus leads to an eight fold reduction (512/64=8 fold reduction) in the number of reply messages. Many of the switch counters are related to specific situations (e.g., errors), and so many performance studies only consume a subset of counters. Further, communication systems 100a and 100b can be configured to improve sampling controls, for example, samples that can be taken at quick intervals (high resolution) without causing added network traffic and thus without added distortion.

Turning to FIG. 1, FIG. 1 is a simplified block diagram of a communication system 100a to implement improved performance monitoring of a network, in accordance with an embodiment of the present disclosure. As illustrated in FIG. 1, communication system 100a can include a network 102a. One or more electronic devices 104 may be connected to network 102a. In addition, one or more secondary networks 106 may be connected to network 102a and one or more electronic devices 104 may be connected to secondary network 106.

Network 102a can include a plurality of host 108 and one or more network managers 120. Network manager 120 can include network manager engine 122. Network manager 120 can be configured to use network manager engine 122 to send one or more request messages (e.g., request message 116) to hosts 108.

In an example, a host 108a can include memory 110a, one or more indicators 112a and 112b, and an indicator engine 114a. Indicator engine 114a can include one or more request messages 116a-116c. A host 108b can include memory 110b, one or more indicators 112a and 112b, and indicator engine 114b. Indicator engine 114b can include one or more request messages 116a-116c. A host 108c can include memory 110c, one or more indicators 112a and 112b, and an indicator engine 114c. Indicator engine 114c can include one or more request messages 116a and 116b. Network elements 1108d and 108e may not include indicators or an indicator engine. Note that network 102a can include a plurality of hosts 108 and each of the plurality of network elements may or may not include indicators or an indicator engine. In an example, indicators 112a and 112b can each include data or indicators related to a network element (e.g., hosts 108a-108c) and/or network 102a. In a specific example, indicators 112a and 112b can each include data or indicators related to the performance (e.g., network congestion, data flow, etc.) of network 108a. Request messages 116a-116c can include requests for data related to indicators 112a and 112b. Each indicator engine 114a-114c can be configured to help process request messages 116a-116c.

Elements of FIG. 1 may be coupled to one another through one or more interfaces employing any suitable connections (wired or wireless), which provide viable pathways for network (e.g., network 102a, etc.) communications. Additionally, any one or more of these elements of FIG. 1 may be combined or removed from the architecture based on particular configuration needs. Communication system 100a may include a configuration capable of transmission control protocol/Internet protocol (TCP/IP) communications for the transmission or reception of packets in a network. Communication system 100a may also operate in conjunction with a user datagram protocol/IP (UDP/IP) or any other suitable protocol where appropriate and based on particular needs.

Turning to FIG. 2, FIG. 2 is a simplified block diagram of a communication system 100b for performance monitoring, in accordance with an embodiment of the present disclosure. As illustrated in FIG. 2, communication system 100b can include a network 102b. One or more electronic devices 104 may be connected to network 102b. In addition, one or more secondary networks 106 may be connected to network 102b and one or more electronic devices 104 may be connected to secondary network 106. In an example, one or more electronic devices 104 can include network manager 120. Network manager 120 can be configured to use network manager engine 122 to send one or more request messages (e.g., request message 116) to a plurality of switches 124. The term "plurality of switches" includes a plurality of switching elements, switches, or any other device that can receive and forward data.

Network 102b can include plurality of switches 124 and a plurality of hosts 108d-108g. In an example, a switch 124a can include memory 110d, one or more counters 126a and 126b, and a sample engine 128a. Memory 110d can include a buffer 130a. Sample engine engine 128a can include a request message 116d. A switch 124b can include memory 110e, one or more counters 126a-126c, and a sample engine 128b. Memory 110e can include a buffer 130b. Sample engine 128b can include one or more request messages 116d and 116e. A switch 124c can include memory 110f, one or more counters 126a, and a sample engine 128c. Memory 110f can include a buffer 130c. Sample engine 128c can include one or more request messages 116d and 116e. A switch 124d can include memory 110g, one or more counters 126a-126c, and a sample engine 128d. Memory 110g can include a buffer 130d. Sample engine 128d can include one or more request messages 116d-116f.

Elements of FIG. 2 may be coupled to one another through one or more interfaces employing any suitable connections (wired or wireless), which provide viable pathways for network (e.g., network 102b, etc.) communications. Additionally, any one or more of these elements of FIG. 1 may be combined or removed from the architecture based on particular configuration needs. Communication system 100b may include a configuration capable of transmission control protocol/Internet protocol (TCP/IP) communications for the transmission or reception of packets in a network. Communication system 100b may also operate in conjunction with a user datagram protocol/IP (UDP/IP) or any other suitable protocol where appropriate and based on particular needs. Messages through the network or fabric could be made in accordance with various network protocol (e.g., Ethernet, Infiniband, Omni-Path, etc.)

Turning to the infrastructure of FIGS. 1 and 2, communication systems 100a and 100b in accordance with an example embodiment is shown. Generally, communication systems 100a and 100b may be implemented in any type or topology of networks. Networks 102a and 102b each represents a series of points or nodes of interconnected communication paths for receiving and transmitting packets of information that propagate through communication systems 100a and 100b. Networks 102a and 102b offer a communicative interface between nodes, and may be configured as any local area network (LAN), virtual local area network (VLAN), wide area network (WAN), wireless local area network (WLAN), metropolitan area network (MAN), Intranet, Extranet, virtual private network (VPN), and any other appropriate architecture or system that facilitates communications in a network environment, or any suitable combination thereof, including wired and/or wireless communication.

In communication systems 100a and 100b, network traffic, which is inclusive of packets, frames, signals, data, etc., can be sent and received according to any suitable communication messaging protocols. Suitable communication messaging protocols can include a multi-layered scheme such as Open Systems Interconnection (OSI) model, or any derivations or variants thereof (e.g., Transmission Control Protocol/Internet Protocol (TCP/IP), user datagram protocol/IP (UDP/IP)). Additionally, radio signal communications over a cellular network may also be provided in communication systems 100a and 100b. Suitable interfaces and infrastructure may be provided to enable communication with the cellular network.

The term "packet" as used herein, refers to a unit of data that can be routed between a source node and a destination node on a packet switched network. A packet includes a source network address and a destination network address. These network addresses can be Internet Protocol (IP) addresses in a TCP/IP messaging protocol. The term "data" as used herein, refers to any type of binary, numeric, voice, video, textual, or script data, or any type of source or object code, or any other suitable information in any appropriate format that may be communicated from one point to another in electronic devices and/or networks. The data may help determine a status of a network element or network. The term "status" is to include congestion of the network, data related to traffic or flow patterns of the network, or another type of data or information that helps to determine the performance, state, condition, etc. of the network, either overall or related to one or more network elements. Additionally, messages, requests, responses, and queries are forms of network traffic, and therefore, may comprise packets, frames, signals, data, etc.

In an example implementation, electronic devices 104, hosts 108a-108g, and switches 124a-124d are network elements, which are meant to encompass network appliances, servers, routers, switches, gateways, bridges, load balancers, processors, modules, or any other suitable device, component, element, or object operable to exchange information in a network environment. Network elements may include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information.

In regards to the internal structure associated with communication systems 100a and 100b, each of electronic devices 104, hosts 108a-108g, and switches 124a-124d can include memory elements for storing information to be used in the operations outlined herein. Each of electronic devices 104, hosts 108a-108g, and switches 124a-124d may keep information in any suitable memory element (e.g., random access memory (RAM), read-only memory (ROM), erasable programmable ROM (EPROM), electrically erasable programmable ROM (EEPROM), application specific integrated circuit (ASIC), etc.), software, hardware, firmware, or in any other suitable component, device, element, or object where appropriate and based on particular needs. Any of the memory items discussed herein should be construed as being encompassed within the broad term 'memory element.' Moreover, the information being used, tracked, sent, or received in communication systems 100a and 100b could be provided in any database, register, queue, table, cache, control list, or other storage structure, all of which can be referenced at any suitable timeframe. Any such storage options may also be included within the broad term 'memory element' as used herein.

In certain example implementations, the functions outlined herein may be implemented by logic encoded in one or more tangible media (e.g., embedded logic provided in an ASIC, digital signal processor (DSP) instructions, software (potentially inclusive of object code and source code) to be executed by a processor, or other similar machine, etc.), which may be inclusive of non-transitory computer-readable media. In some of these instances, memory elements can store data used for the operations described herein. This includes the memory elements being able to store software, logic, code, or processor instructions that are executed to carry out the activities described herein.

In an example implementation, network elements of communication systems 100a and 100b, such as electronic devices 104, hosts 108a-108g, and switches 124a-124d may include software modules (e.g., indicator engine 114a-114c, network manager engine 122, sample engine 128a-128d, etc.) to achieve, or to foster, operations as outlined herein. These modules may be suitably combined in any appropriate manner, which may be based on particular configuration and/or provisioning needs. In example embodiments, such operations may be carried out by hardware, implemented externally to these elements, or included in some other network device to achieve the intended functionality. Furthermore, the modules can be implemented as software, hardware, firmware, or any suitable combination thereof. These elements may also include software (or reciprocating software) that can coordinate with other network elements in order to achieve the operations, as outlined herein.

Additionally, each of electronic devices 104, hosts 108a-108g, and switches 124a-124d may include a processor that can execute software or an algorithm to perform activities as discussed herein. A processor can execute any type of instructions associated with the data to achieve the operations detailed herein. In one example, the processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read-only memory (EPROM), an electrically erasable programmable read-only memory (EEPROM)) or an ASIC that includes digital logic, software, code, electronic instructions, or any suitable combination thereof. Any of the potential processing elements, modules, and machines described herein should be construed as being encompassed within the broad term 'processor.' Electronic device 104 can be a network element and include end user devices, for example, desktop computers, laptop computers, mobile devices, personal digital assistants, smartphones, tablets, or other similar devices.

Turning to FIG. 3, FIG. 3 is a simplified block diagram of a portion of a message format for performance monitoring, in accordance with an embodiment of the present disclosure. As illustrated in FIG. 3, a request message 116 can include an indicator selector 132, a read trigger 134, and a completion trigger 136. For each request message illustrated in FIGS. 1 and 2, each of indicator selector 132, read trigger 134, and completion trigger 136 may be different. For example, for request message 116a, each of indicator selector 132, read trigger 134, and completion trigger 136 may be different or may be the same for request message 116b, 116c, 116d, 116e, and/or 116f.

Figure 4:
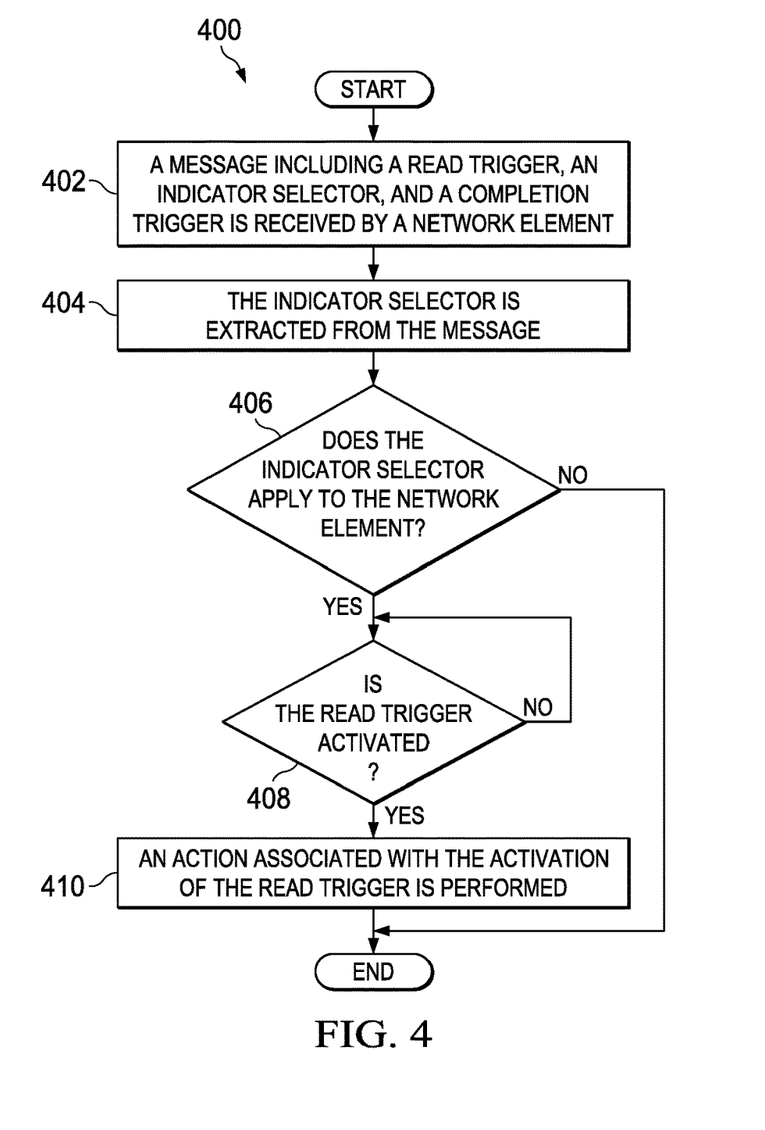
FIG. 4 is a simplified flowchart illustrating potential operations that may be associated with the communication system in accordance with an embodiment.

Turning to FIG. 4, FIG. 4 is an example flowchart illustrating possible operations of a flow 400 that may be associated with performance monitoring, in accordance with an embodiment. In an embodiment, one or more operations of flow 400 may be performed by indicator engine 114a-114c, network manager engine 122, and/or sample engine 128a-128d. At 402, a message including a read trigger, an indicator selector, and a completion trigger is received by a network element. At 404, the indicator selector is extracted from the message. At 406, the system determines if the indicator selector applies to the network element.

If the indicator selector does not apply to the network element, then the flow ends. For example, switch 124a may receive a request message 116f that applies to counter 126c but switch 124a does not include counter 126c so the request message 116f does not apply to switch 124a. In another example, switch 124a may receive a message with a read trigger indicating a condition that has already occurred. For example, the read trigger may indicate that a first sample should be taken at a specific time (e.g., noon), however, due to congestion, or some other reason, the message did not arrive at switch 124a until after the specific time. In another example, the read trigger may indicate that a sample should be taken when the local state reaches a condition but the condition may have already occurred (e.g., when the moving average of congestion is over X, but the moving average of congestion is already over X before the message arrives). When a message is received with a read trigger indicating a condition that has already occurred, the read trigger may be activated as soon as possible, may be ignored, an error message may be sent, etc. For example, a field in a message that includes the read trigger can include instructions that say "read AT time=X" or "read AT OR AFTER time=X". Alternatively, the completion trigger could include an instruction that if no data has been collected, a reply message should not be sent, an "empty" reply message should be sent, an "error" reply message should be sent, or some other response.

If the indicator selector does apply to the network element, then the system determines if the read trigger is activated, as in 408. If the read trigger is not activated, then the system returns to 408 and waits until the read trigger is activated. If the read trigger is activated, then an action associated with the activation of the read trigger is performed, as in 410. For example, the read trigger may be triggered by a timestamp or some other condition and when triggered, the read trigger causes an indicator (e.g., indicator 112a) or a counter (e.g., counter 126a) to be read.

Figure 5:
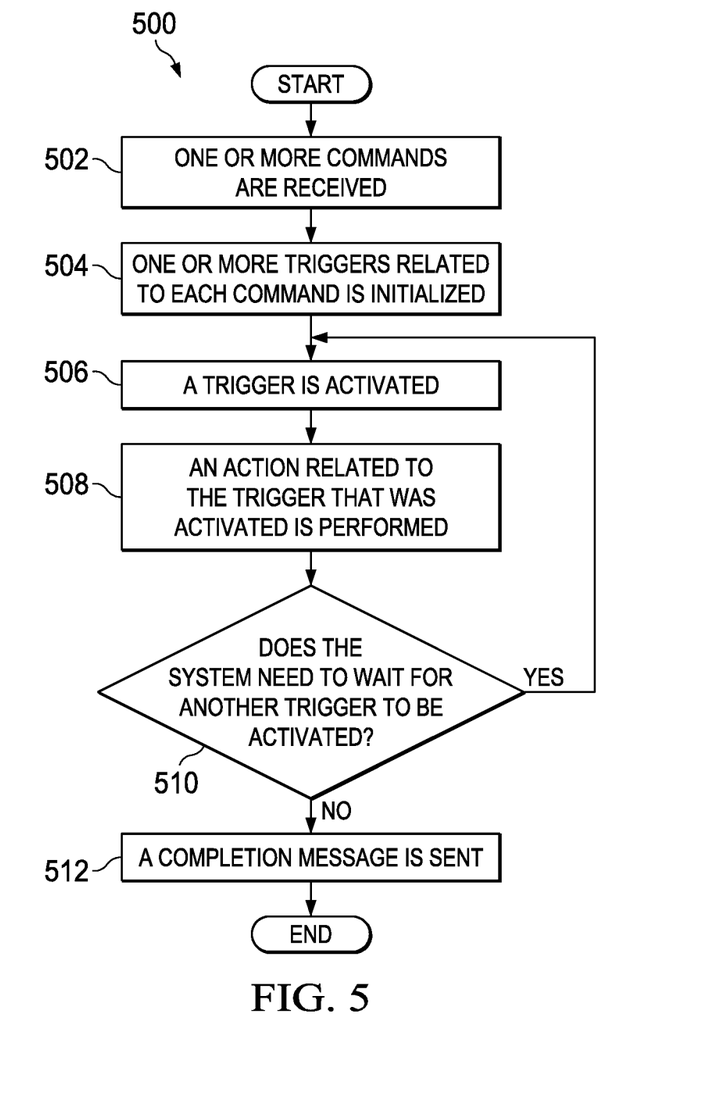
FIG. 5 is a simplified flowchart illustrating potential operations that may be associated with the communication system in accordance with an embodiment.

Turning to FIG. 5, FIG. 5 is an example flowchart illustrating possible operations of a flow 500 that may be associated with process management, in accordance with an embodiment. In an embodiment, one or more operations of flow 500 may be performed by authentication engine 120 and process management cache 122. At 502, one or more commands are received. For example, host 108a or switch 130a may receive one or more request messages 116. At 504, one or more triggers related to each command are initialized. At 506, a trigger is activated. At 508, an action related to the trigger that was activated is performed. At 510, the system determines if it needs to wait for another trigger to be activated. For example, the system may wait for a completion trigger to be activated, the command could include more than one trigger, multiple commands may have been received with each command including a trigger, the trigger may be a periodic type trigger that is triggered for a predetermined number of intervals, etc. If the system determines that it needs to wait for another trigger to be activated, then the system waits for the other trigger to be activated and returns to 506 where the (other) trigger is activated. If the system determines that it does not need to wait for another trigger to be activated, then a completion message is sent, as in 512.

Figure 6:
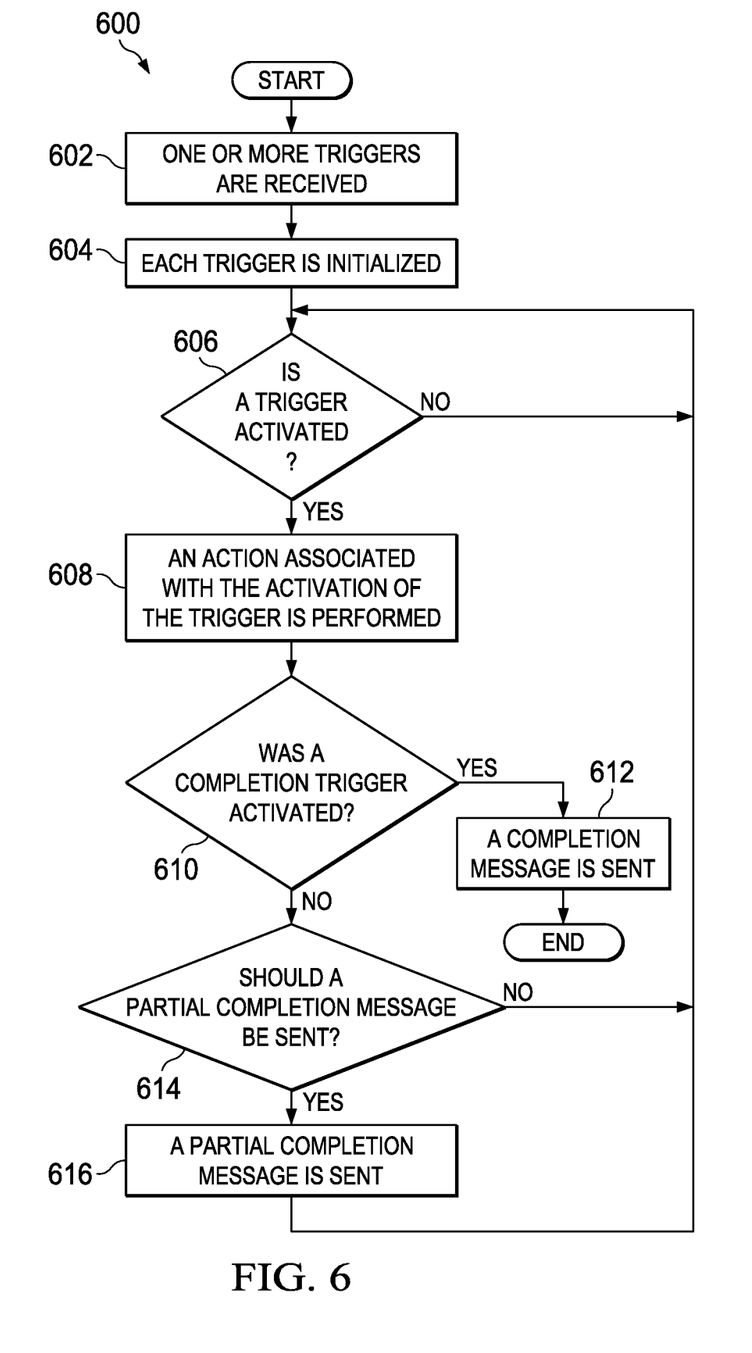
FIG. 6 is a simplified flowchart illustrating potential operations that may be associated with the communication system in accordance with an embodiment.

Turning to FIG. 6, FIG. 6 is an example flowchart illustrating possible operations of a flow 600 that may be associated with process management, in accordance with an embodiment. In an embodiment, one or more operations of flow 600 may be performed by authentication engine 120 and process management cache 122. At 602, one or more triggers are received. For example, host 108a or switch 130a may receive one or more read triggers 134 and completion triggers 136 in one or more request messages 116. At 604, each trigger is initialized. At 606, the system determines if a trigger is activated. If a trigger was not activated, then the system returns to 606 and waits for a trigger to be activated. If a trigger was activated, then an action associated with the activation of the trigger is performed, as in 608. For example, request message 116a may include a read trigger 134 and when read trigger 134 is activated, indicator 112a is read. At 610, the system determines if a completion trigger was activated. If the completion trigger was activated, then a completion message is sent, as in 612. If the completion trigger was not activated, then the system determines if a partial completion message should be sent, as in 614. If a partial completion message should be sent, then a partial completion message is sent, as in 616 and the system returns to 606 and determines if the trigger (or another trigger) is activated. If a partial completion message should not be sent, or does not need to be sent, then the system returns to 606 and determines if the trigger (or another trigger) is activated.

Figure 7:
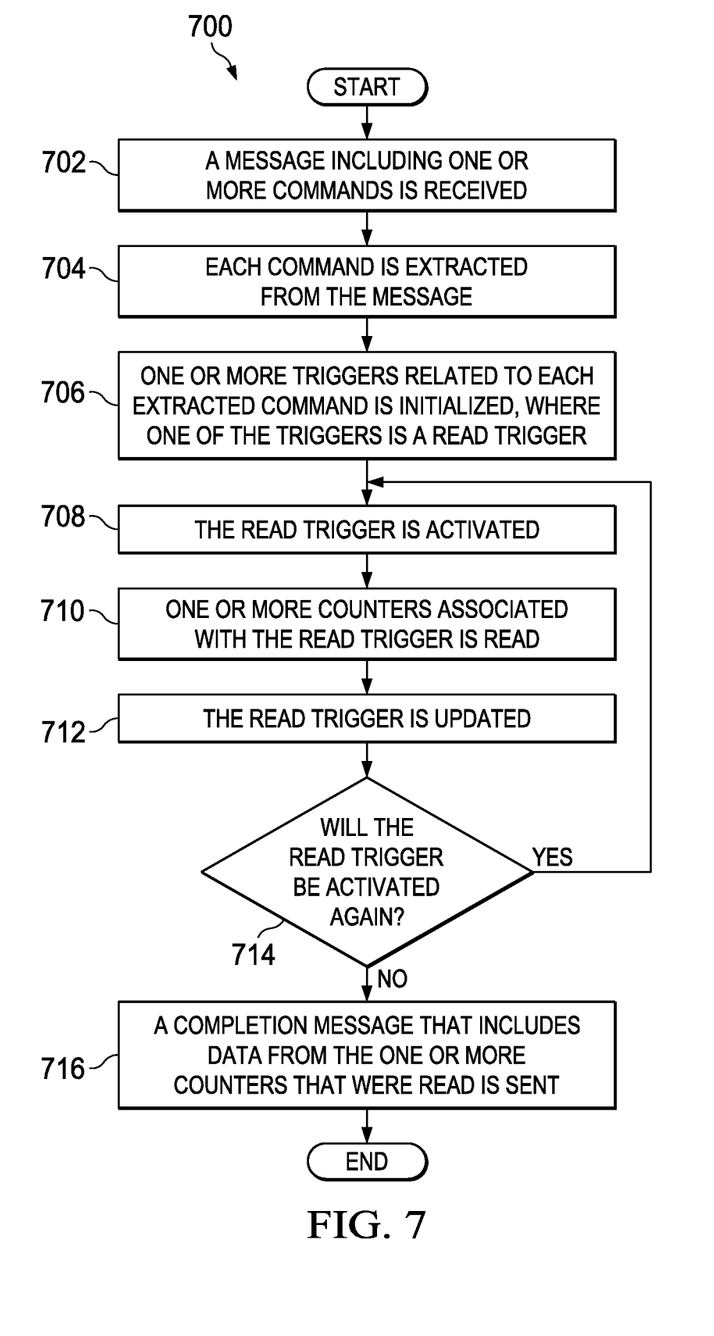
FIG. 7 is a simplified flowchart illustrating potential operations that may be associated with the communication system in accordance with an embodiment.

Turning to FIG. 7, FIG. 7 is an example flowchart illustrating possible operations of a flow 700 that may be associated with process management, in accordance with an embodiment. In an embodiment, one or more operations of flow 700 may be performed by authentication engine 120 and process management cache 122. At 702, a message including one or more commands is received. At 704, each command is extracted from the message. At 706, one or more triggers related to each extracted command is initialized, where one of the one or more triggers is a read trigger. At 708, the read trigger is activated. At 710, one or more counters associated with the read trigger is read. At 712, the read trigger is updated. At 714, the system determines if the read trigger will be activated again. If the read trigger will be activated again, then the system waits for the read trigger to be activated again and returns to 708 where the read trigger is activated. If the read trigger will not be activated again, then a completion message that includes data from the one or more counters that were read is sent, as in 716.

Note that with the examples provided herein, interaction may be described in terms of two, three, or more network elements. However, this has been completion for purposes of clarity and example only. In certain cases, it may be easier to describe one or more of the functionalities of a given set of flows by only referencing a limited number of network elements. It should be appreciated that communication systems 100a and 100b and their teachings are readily scalable and can accommodate a large number of components, as well as more complicated/sophisticated arrangements and configurations. Accordingly, the examples provided should not limit the scope or inhibit the broad teachings of communication system 100 as potentially applied to a myriad of other architectures.

It is also important to note that the operations in the preceding flow diagrams (i.e., FIGS. 4-7) illustrate only some of the possible correlating scenarios and patterns that may be executed by, or within, communication system 100. Some of these operations may be deleted or removed where appropriate, or these operations may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 100 in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. Moreover, certain components may be combined, separated, eliminated, or added based on particular needs and implementations. Additionally, although communication systems 100a and 100b have been illustrated with reference to particular elements and operations that facilitate the communication process, these elements and operations may be replaced by any suitable architecture, protocols, and/or processes that achieve the intended functionality of communication systems 100a and 100b.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

Other Notes and Examples

Example C1 is at least one machine readable storage medium having one or more instructions that when executed by at least one processor, cause the at least one processor to receive a request message, where the request message includes a read trigger, an indicator selector, and a completion trigger, determine one or more indicators that relate to the indicator selector, and perform an action when the read trigger is activated.

In Example C2, the subject matter of Example C1 can optionally include where the instructions, when executed by the by at least one processor, further cause the at least one processor to read a status of an indicator that relates to the indicator selector and store the status in a buffer.

In Example C3, the subject matter of any one of Examples C1-C2 can optionally include where the status of the indicator provides data related to the performance of a network.

In Example C4, the subject matter of any one of Examples C1-C3 can optionally include where the instructions, when executed by the by at least one processor, further cause the at least one processor to communicate at least a portion of the buffer to a network manager when the completion trigger is activated.

In Example C5, the subject matter of any one of Examples C1-C4 can optionally include where the read trigger is a compound expression.

In Example C6, the subject matter of any one of Examples C1-C5 can optionally include where the read trigger is not activated if it is determined that the at least one machine readable medium does not include the indicator that relates to the indicator selector.

In Example C7, the subject matter of any one of Examples C1-C6 can optionally include where the indicator is a performance counter.

In Example C8, the subject matter of any one of Examples C1-C7 can optionally include where the at least one determined indicator is a plurality of performance counters and the plurality of performance counters is a subset of all the available counters.

In Example C9, the subject matter of any one of Examples C1-C8 can optionally include where the read trigger is a compound expression and the compound expression is a OR b.

In Example C10, the subject matter of any one of Examples C1-C9 can optionally include where the read trigger is a compound expression and the compound expression is a AND b.

In Example C11, the subject matter of any one of Examples C1-C10 can optionally include where the read trigger is a compound expression and the compound expression is a NOR b.

In Example C12, the subject matter of any one of Examples C1-C11 can optionally include where the read trigger is a compound expression and the compound expression is a NAD b.

In Example C13, the subject matter of any one of Examples C1-C12 can optionally include where the read trigger is a compound expression and the compound expression is a, b OR c.

In Example C14, the subject matter of any one of Examples C1-C13 can optionally include where the read trigger is a compound expression and the compound expression is a, b AND c.

In Example C15, the subject matter of any one of Examples C1-C14 can optionally include where the read trigger is a compound expression and the compound expression is a, b NOR c.

In Example C16, the subject matter of any one of Examples C1-C15 can optionally include where the read trigger is a compound expression and the compound expression is a, b NAND c.

In Example C17, the subject matter of any one of Examples C1-C16 can optionally include where the read trigger indicates when a congestion metric is observed.

In Example C18, the subject matter of any one of Examples C1-C17 can optionally include where the read trigger indicates when a local storage is full.

In Example C19, the subject matter of any one of Examples C1-C18 can optionally include where he read trigger indicates when a predetermined amount of time has expired.

In Example C20, the subject matter of any one of Examples C1-C19 can optionally include where the read trigger indicates when an exit time has occurred.

In Example C21, the subject matter of any one of Examples C1-C20 can optionally include where the action performed when the read trigger is activated includes collecting data until a local storage is full.

In Example C22, the subject matter of any one of Examples C1-C21 can optionally include where the action performed when the read trigger is activated includes collecting data until until a local storage reaches a predetermined level.

In Example C23, the subject matter of any one of Examples C1-C22 can optionally include where the action performed when the read trigger is activated includes collecting data until a predetermined amount of time has passed.

In Example C24, the subject matter of any one of Examples C1-C23 can optionally include where the action performed when the read trigger is activated includes collecting data until a specific time is reached.

In Example C25, the subject matter of any one of Examples C1-C24 can optionally include where the action performed when the read trigger is activated includes collecting data and averaging the data over an interval.

In Example C26, the subject matter of any one of Examples C1-C25 can optionally include where the action performed when the read trigger is activated includes collecting data and combining the data into a singular reply.

In Example A1, an apparatus can include memory, at least one processor, and a network manager engine. The network manager engine can be configured to communicate a request message to a plurality of network elements, where the request message includes a read trigger, an indicator selector, and a completion trigger, and receive a response to the request message from at least a portion of the plurality of network elements, where the response was sent when the completion trigger was activated.

In Example, A2, the subject matter of Example A1 can optionally include where the read trigger causes each network element that includes an indicator that relates to the indicator selector to read a status of the indicator.

In Example A3, the subject matter of any one of Examples A1-A2 can optionally include where only a portion of the plurality of network elements include the indicator.

In Example A4, the subject matter of any one of Examples A1-A3 can optionally include where the indicator is a performance counter.

In Example A5, the subject matter of any one of Examples A1-A4 can optionally include where the read trigger is a compound expression.

Example M1 is a method including receiving a request message, where the request message includes a read trigger, an indicator selector, and a completion trigger, determining one or more indicators that relate to the indicator selector, and performing an action when the read trigger is activated.

In Example M2, the subject matter of Example M1 can optionally include reading the status of an indicator that relates to the indicator selector and storing the status in a buffer.

In Example M3, the subject matter of any one of the Examples M1-M2 can optionally include communicating at least a portion of the buffer to a network manager when the completion trigger is activated.

In Example M4, the subject matter of any one of the Examples M1-M3 can optionally include where the read trigger is a compound expression.

In Example M5, the subject matter of any one of the Examples M1-M4 can optionally include where the read trigger is not activated if it is determined that the at least one machine readable medium does not include the indicator that relates to the indicator selector.

In Example M6, the subject matter of any one of Examples M1-M5 can optionally include where the indicator is a performance counter.

Example S1 is a system for for process management, the system can include memory, one or more processors, and an indicator engine. The indicator engine can be configured to receive a request message, where the request message includes a read trigger, an indicator selector, and a completion trigger, determine one or more indicators that relate to the indicator selector, and perform an action when the read trigger is activated.

In Example S2, the subject matter of Example S1 can optionally include where the indicator engine is further configured to read the status of an indicator that relates to the indicator selector and store the status in a buffer.

In Example S3, the subject matter of any one of the Examples S1-S2 can optionally include where the status of the indicator provides data related to the performance of a network.

In Example S4, the subject matter of any one of the Examples S1-S3 can optionally include where the indicator engine is further configured to communicate at least a portion of the buffer to a network manager when the completion trigger is activated.

In Example S5, the subject matter of any one of the Examples S1-S4 can optionally include where the read trigger is a compound expression.

In Example S6, the subject matter of any one of the Examples S1-S5 can optionally include where the read trigger is not activated if it is determined that the at least one machine readable medium does not include the indicator that relates to the indicator selector.

In Example S7, the subject matter of any one of the Examples S1-S6 can optionally include where the indicator is a performance counter.

Example AA1 is an apparatus including means to receive a request message, where the request message includes a read trigger, an indicator selector, and a completion trigger, means to determine one or more indicators that relate to the indicator selector, and means to perform an action when the read trigger is activated.

In Example AA2, the subject matter of Example AA1 can optionally where the instructions, when executed by the by at least one processor, further cause the at least one processor to read a status of an indicator that relates to the indicator selector and store the status in a buffer.

In Example AA3, the subject matter of any one of Examples AA1-AA2 can optionally include where the status of the indicator provides data related to the performance of a network.

In Example AA4, the subject matter of any one of Examples AA1-AA3 can optionally include means to communicate at least a portion of the buffer to a network manager when the completion trigger is activated.

In Example AA5, the subject matter of any one of Examples AA1-AA4 can optionally include where the read trigger is a compound expression.

In Example AA6, the subject matter of any one of Examples AA1-AA5 can optionally include where the read trigger is not activated if it is determined that the at least one machine readable medium does not include the indicator that relates to the indicator selector.

In Example AA7, the subject matter of any one of Examples AA1-AA6 can optionally include where the indicator is a performance counter.

Example AAA is an apparatus including memory, an indicator engine, and at least one processor. The at least one processor can be configured to cause the indicator engine to receive a request message, wherein the request message includes a read trigger, an indicator selector, and a completion trigger, determine at least one indicator that relates to the indicator selector, perform an action when the read trigger is activated, read a status of the indicator that relates to the indicator selector, and store the status in a buffer.

In Example AAA2, the subject matter of Example AAA1 can optionally include where he status of the indicator provides data related to the performance of a network.

In Example AAA3, the subject matter of any one of Examples AAA1-AAA2 can optionally include where the read trigger is a compound expression.

In Example AAA4, the subject matter of any one of Examples AAA1-AAA3 can optionally include where the indicator is a performance counter.

Example X1 is a machine-readable storage medium including machine-readable instructions to implement a method or realize an apparatus as in any one of the Examples A1-A5, M1-M6, or AA1-AA7. Example Y1 is an apparatus comprising means for performing of any of the Example methods M1-M6. In Example Y2, the subject matter of Example Y1 can optionally include the means for performing the method comprising a processor and a memory. In Example Y3, the subject matter of Example Y2 can optionally include the memory comprising machine-readable instructions.

What is claimed is:

1. At least one non-transitory machine readable medium comprising one or more instructions that, when executed by at least one processor, cause the at least one processor to:
   receive a request message from a network manager, wherein the request message was communicated over a network that includes a plurality of switches and includes a read trigger, an indicator selector, and a completion trigger;
   determine at least one indicator that relates to the indicator selector; and
   perform an action when the read trigger is activated.

2. The at least one machine readable medium of claim 1, further comprising one or more instructions that when executed by the at least one processor, further cause the at least one processor to:
   read a status of the indicator that relates to the indicator selector; and
   store the status in a buffer.

3. The at least one machine readable medium of claim 2, wherein the status of the indicator provides data related to a performance of the network.

4. The at least one machine readable medium of claim 2, further comprising one or more instructions that when executed by the at least one processor, further cause the at least one processor to:
   communicate at least a portion of the buffer to the network manager when the completion trigger is activated.

5. The at least one machine readable medium of claim 1, wherein the read trigger is a compound expression.

6. The at least one machine readable medium of claim 1, wherein the read trigger is not activated if it is determined that the at least one machine readable medium does not include the indicator that relates to the indicator selector.

7. The at least one machine readable medium of claim 1, wherein the indicator is a performance counter.

8. The at least one machine readable medium of claim 1, wherein the at least one determined indicator is a plurality of performance counters and the plurality of performance counters are a subset of available counters.

9. An apparatus comprising:
memory;
an indicator engine; and
at least one processor, wherein the at least one processor is configured to cause the indicator engine to:
 receive a request message from a network manager, wherein the request message was communicated over a network that includes a plurality of switches and includes a read trigger, an indicator selector, and a completion trigger;
 determine at least one indicator that relates to the indicator selector; perform an action when the read trigger is activated;
 read a status of the indicator that relates to the indicator selector; and
 store the status in a buffer.

10. The apparatus of claim 9, wherein the status of the indicator provides data related to a performance of the network.

11. The apparatus of claim 9, wherein the read trigger is a compound expression.

12. The apparatus of claim 9, wherein the indicator is a performance counter.

13. A method comprising:
receiving a request message, wherein the request message was communicated over a network that includes a plurality of switches and includes a read trigger, an indicator selector, and a completion trigger;
determining at least one indicator that relate to the indicator selector; and
performing an action when the read trigger is activated.

14. The method of claim 13, further comprising:
reading a status of the indicator that relates to the indicator selector; and
storing the status in a buffer.

15. The method of claim 14, further comprising:
communicating at least a portion of the buffer to a network manager when the completion trigger is activated.

16. The method of claim 13, wherein the read trigger is a compound expression.

17. The method of claim 13, wherein the read trigger is not activated if it is determined that the at least one machine readable medium does not include the indicator that relates to the indicator selector.

18. The method of claim 13, wherein the indicator is a performance counter.

19. A system for process management, the system comprising:
memory;
one or more processors; and
an indicator engine configured to:
 receive a request message, wherein the request message was communicated over a network that includes a plurality of switches and includes a read trigger, an indicator selector, and a completion trigger;
 determine one or more indicators that relate to the indicator selector; and
 perform an action when the read trigger is activated.

20. The system of claim 19, wherein the indicator engine is further configured to:
read a status of the indicator one or more indicators that relates to the indicator selector; and
store the status in a buffer.

21. The system of claim 20, wherein the status of the one or more indicators provides data related to a performance of a network.

22. The system of claim 20, wherein the indicator engine is further configured to:
communicate at least a portion of the buffer to a network manager when the completion trigger is activated.

23. The system of claim 19, wherein the read trigger is a compound expression.

24. The system of claim 19, wherein the read trigger is not activated if it is determined that the at least one machine readable medium does not include the one or more indicators that relate to the indicator selector.

25. The system of claim 19, wherein the one or more indicators are a performance counter.

* * * * *

UNITED STATES PATENT AND TRADEMARK OFFICE
CERTIFICATE OF CORRECTION

PATENT NO. : 10,771,404 B2
APPLICATION NO. : 15/388604
DATED : September 8, 2020
INVENTOR(S) : David Pardo Keppel et al.

Page 1 of 1

It is certified that error appears in the above-identified patent and that said Letters Patent is hereby corrected as shown below:

In the Claims

In Column 18, Line 22, in Claim 20, before "one" delete "indicator".

Signed and Sealed this
Twentieth Day of October, 2020

Andrei Iancu
*Director of the United States Patent and Trademark Office*